United States Patent [19]

Nanbu et al.

[11] Patent Number: 4,848,727
[45] Date of Patent: Jul. 18, 1989

[54] SOLENOID VALVE

[75] Inventors: Masahiro Nanbu, Tama; Hiroyuki Suda, Komagane, both of Japan

[73] Assignee: Koganei Ltd., Tokyo, Japan

[21] Appl. No.: 143,355

[22] Filed: Jan. 12, 1988

[30] Foreign Application Priority Data

Mar. 30, 1987 [JP] Japan .............................. 62-48089[U]

[51] Int. Cl.[4] .............................................. F16K 31/06
[52] U.S. Cl. ........................... 251/129.16; 251/129.19; 137/625.65
[58] Field of Search ....................... 251/129.16, 129.19; 137/625.65

[56] References Cited

U.S. PATENT DOCUMENTS

| 2,461,772 | 2/1949 | Ray ................................... 251/129.16 |
| 3,422,850 | 1/1969 | Caldwell ..................... 251/129.16 X |
| 3,827,672 | 8/1974 | Stampfli ...................... 137/625.65 X |
| 3,921,670 | 11/1975 | Clippard, Jr. et al. ......... 137/625.65 |
| 4,076,045 | 2/1978 | Nakajima et al. .............. 137/625.65 |
| 4,196,751 | 4/1980 | Fischer et al. .............. 251/129.16 X |
| 4,299,252 | 11/1981 | Reinicke ..................... 137/625.65 X |
| 4,392,634 | 7/1983 | Kita ............................... 251/129.19 |
| 4,601,458 | 7/1986 | Sheppard ........................ 251/129.19 |

Primary Examiner—Arnold Rosenthal
Attorney, Agent, or Firm—Rodman & Rodman

[57] ABSTRACT

A solenoid valve having a movable member being moved by an electromagnetic attraction of a solenoid section in a valve chest between the solenoid section. A valve seat opposed thereto and a valve body provided an the movable member is abutted against or separated from the valve seat to close or open a valve port or ports. The movable member is supported in the valve chest through a support member or members for regulating a displacement of the movable member in a direction perpendicular to the moving direction of the movable member. The valve body may be fixed to or movable from the movable member. The movable member is formed with a through-hole for receiving the valve body, which extends in the moving direction thereof. The valve body, formed of an elastic material, is disposed in the through-hole and a surface of the valve body, which is opposed to the solenoid section forms a surface of the movable member, which is abutted against the solenoid section. There are provided a first valve port formed on the solenoid section side and a second valve port opposed thereto. The valve body need not be fixed to the movable member so that the valve body is moved toward the second valve seat without being influenced by the movement of the movable member toward the second valve seat. One surface of the valve body is abutted against or separated from a first valve seat of the first valve port to close or open the first valve port and the other surface of the valve body is abutted against or separated from a second valve seat of the second valve port to close or open the second valve port.

9 Claims, 5 Drawing Sheets

SOLENOID VALVE

BACKGROUND OF THE INVENTION

1. Field of the Invention

This invention relates to a solenoid valve for use in ON-OFF operation and switching of a flow of fluid such as air.

2. Related Art Statement

A known solenoid valve of the type described, includes a solenoid section provided with a solenoid coil and a fixed iron core; a valve seat opposed to the solenoid section in a valve chest; a valve port of this valve seat; a movable member with a valve body, which is positioned between the solenoid section and the valve seat in the valve chest that is moved by magnetic action; and a resilient member such as a spring for biasing this movable member from the underside of the solenoid section to the valve seat. During non-excitation of the solenoid section, the movable member is urged against the valve seat by the biasing force of the resilient member or the like to close the valve port. During excitation of the solenoid section, the movable member is separated from the valve seat by the magnetic attracting action of the solenoid section against the biasing force of the resilient member or the like and attracted to the fixed iron core, thereby opening the valve port. The movable member is reciprocated between the solenoid section and the valve seat in the valve chest, whereby the valve port is ON-OFF operated, so that the flow of the fluid can be switch controlled.

The movable member is reciprocated between the solenoid section and the valve seat in the valve chest due to the magnetic attraction of the solenoid section, for ON-OFF operation of the valve port. However, since the displacement of the movable member is not regulated in a direction perpendicular to the reciprocatory movement the outer peripheral portion of the movable member comes into contact with or slides on the inner wall surface of the valve chest. A resulting disadvantage is when the outer peripheral portion of this movable member comes into contact with or slides on the inner wall surface of the valve chest, whereby the contact portion and the sliding portion are worn, the dust or debris caused by wear moves to a fluidal circuit connected to the solenoid valve, to thereby hinder other components.

A further disadvantage is that, due to the wear of the above-described contact portion and sliding portion, smooth operation of the movable member is hindered.

In the known solenoid valve, when the solenoid section is deenergized, the movable member which has been in contact with the fixed iron core is moved to the side of the valve seat by the biasing force of a resilient member such as the spring or the like, whereby the valve body abuts against the valve seat. As the valve body is fixed to the movable member, in addition to the biasing force of the resilient member such as a spring or the like, an inertial force of the valve body and the inertial force of the movable member, which is substantially larger than the former inertial force, are directly applied to the contact portion between the valve body and the valve seat. A resulting disadvantages due to the biasing force of the resilient member such as a spring or the like, and the inertial forces of the movable member and the valve body which are directly applied to the contact portion between the valve body and the valve seat, is that the contact portion between the valve body and the valve seat is worn and damaged, to thereby impair the function of the solenoid valve.

Also, in the known solenoid valve, when the movable member is brought into abutting contact with the fixed iron core of the solenoid section due to the magnetic attracting action of the solenoid section, by percussions occurring between the metallic abutting surfaces of both members, the abutting surfaces of both members are worn, so that the solenoid valve cannot be used for a long period of time and with high frequency.

As a means for preventing the foregoing disadvantages a shock-absorbing member formed of resilient material is provided on either the abutting surface of the movable member or the abutting surface of the fixed iron core of the solenoid section. However, the provision of a shock-absorbing member makes the construction complicated. Furthermore, when the shock-absorbing member is provided on the movable member, if a coupling groove is formed in the movable member and the shock-absorbing member is to be coupled into this coupling groove, then, the thickness of the shock-absorbing member is restricted by the depth of the coupling groove, i.e., the thickness of the movable member. Due to the small thickness, only a shock-absorbing member of low resiliency can be provided. Accordingly, a satisfactory shock-absorbing effect cannot be obtained.

However, if the thickness of the movable member is increased to deepen the coupling groove, whereby a shock-absorbing member having a large thickness can be provided, then, the inertial force of the movable member during its movement is increased by as much as the thickness of the movable member is increased. Therefore the impact forces of the movable member, which is aplied to the fixed iron core and the valve seat, is increased such that a satisfactory shock-absorbing effect still cannot be obtained.

Furthermore, the valve body of the above-described solenoid valve is constructed such that the valve body is moved in association with the movement of the movable member at all times. The inertial force of the movable member is larger in value than the inertial force of the valve body and the inertial force of the valve body itself is applied to the valve body to abut the valve body against the valve seat. A resulting disadvantage is that the valve body and/or the valve seat wears and is likely to become damaged.

Further, in the above-described solenoid valve, when a plurality of valve bodies, one for ON-OFF operation of a first valve port and the other for ON-OFF operation of a second valve port, are provided in the movable member, these valve bodies are supported by shock-absorbing springs in the movable member. A disadvantage of this arrangement is that the movable member becomes large in size and complicated in construction.

SUMMARY OF THE INVENTION

The present invention has been developed to obviate the above-described disadvantages and has as one of its objects the provision of a solenoid valve constructed such that the outer peripheral portion of the movable member does not come into contact with or slide on the inner wall surface of the valve chest.

Another object of the present invention is to provide a solenoid valve constructed such that the inertial force of the movable member is not directly applied to a contact portion between the valve body and the valve seat, thus providing higher durability.

A further object of the present invention is to provide a solenoid valve construction wherein absorb to absorb the shock given by the movable member to the solenoid section can be simplified, and yet, a satisfactory shock-absorbing effect can be obtained, abutting surfaces of the movable member and the solenoid section can be satisfactorily prevented from being worn, thereby improving the durability thereof.

A still further object of the present invention is to provide a solenoid valve, wherein operating reliability and durability can be improved, and compactness and simplification of the construction can be attained.

To achieve the above-described objects, the present invention contemplates a solenoid valve constructed such that the movable member with a valve body, which moves between the solenoid section and the valve seat in the valve chest, is supported in the valve chest by a support member which controls displacement of the movable member in a direction perpendicular to the direction of movement of the movable member.

In the solenoid valve the movable member with the valve body, for ON-OFF operation of the valve port is supported in the valve chest by the support member which controls displacement of the movable member in the direction perpendicular to the direction of movement. Thus the movable member is prevented from being displaced in the direction perpendicular to its direction of movement. Accordingly, the outer peripheral portion of the movable member does not come into contact with or slide on the inner wall surface of the valve chest due to the above-described displacement of the movable member. Thus the movement of the movable member can be performed smoothly and reliably.

In another embodiment of the solenoid value according to the present invention, the valve body is not fixed to the movable member. The valve body is thus enabled to remove toward the solenoid section in association with the movement of the movable member toward the solenoid section and moves toward the valve seat without being influenced by movement of the movable member toward the valve seat.

When the movable member of the solenoid valve moves toward the solenoid section, the valve body also moves toward the solenoid section in association with the movement of the movable member toward the solenoid section. However, when the movable member moves toward the valve seat, the valve body moves toward the valve seat uninfluenced by the movement of the movable member toward the valve seat. Thus the valve body is moved toward the valve seat and is urged thereagainst without being directly subject to the inertial force of the movable member due to its movement toward the valve seat. Accordingly, the inertial force of the movable member is not directly applied to the contact portion between the valve body and the valve seat. Thus the contact portions of the valve body and the valve seat can be prevented from being worn or damaged by inertial force of the movable member.

In another embodiment of the solenoid valve according to the present invention, the solenoid valve includes a movable member, which is attracted by the magnetic attracting action of the solenoid section, to thereby move between the solenoid section and the valve seat opposed thereto in the valve chest. A through-hole is formed in the movable member in the direction of movement for receiving the valve body. The valve body is formed of an elastic material and is received in the through-hole. The surface of the valve body, which is opposed to the solenoid section, is abutted against the solenoid section when the movable member is attracted by the solenoid section.

When the movable member is attracted by the magnetic attracting action of the solenoid section to move toward the solenoid section, the surface of the valve body, which is opposed to the solenoid section, abuts against the solenoid section. The impact shock at the time of abutting is relieved by the elastic force of the valve body because the valve body, which has been abutted against the solenoid section is made of elastic material. Thus a shock-absorbing effect of the movable member to the solenoid section can be obtained, so that the abutted surfaces between the movable member and the solenoid section can be prevented from being worn.

In a still further embodiment of the present invention, the solenoid valve includes a first valve port on the underside of the solenoid section, a second valve port opposed to the first valve port. A movable member with a valve body is moved between the first and second valve ports by magnetic attraction of the solenoid section. The movable member is supported by a support member which controls displacement in a direction perpendicular to the moving direction. The single valve body is not fixed to the movable member so that movement of the valve body toward the second valve port is uninfluenced by movement of the movable member toward the second valve port. One surface of the valve body is adapted to abut against or be separated from a first valve seat of the first valve port to thereby close or open the first valve port. The other surface of the valve body is adapted to abut against or be separated from a second valve seat of the second valve port to thereby close or open the second valve port.

The movable member is prevented from being displaced in the direction perpendicular to the moving direction by the support provided by the support member. Thus, the outer peripheral portion of the movable member does not come into contact with or slide on the inner wall surface of the valve chest. Consequently the outer peripheral portion of the movable member can be prevented from being worn, and the movable member can be operated smoothly and reliably.

Furthermore, the valve body is not fixed to the movable member so that movement of the valve body toward the second valve port is uninfluenced by movement of the movable member toward the second valve port. When the movable member moves toward the second valve port, the valve body moves toward the second valve port and is abutted against the second valve seat without being subject to the inertial force of the movable member. Thus the valve body and the second valve seat can be effectively prevented from being worn or damaged.

Further, the single valve body is provided on the movable member, whereby both the first and second valve ports can be opened or closed by the single valve body. Thus the solenoid valve can be rendered compact in size and simplified in construction.

Additionally, the aforesaid and other objects, and advantages of the present invention will become apparent more fully from the following detailed description in conjunction with the accompanying drawings.

DETAILED DESCRIPTION OF THE PREFERRED EMBODIMENTS

Figure 1:
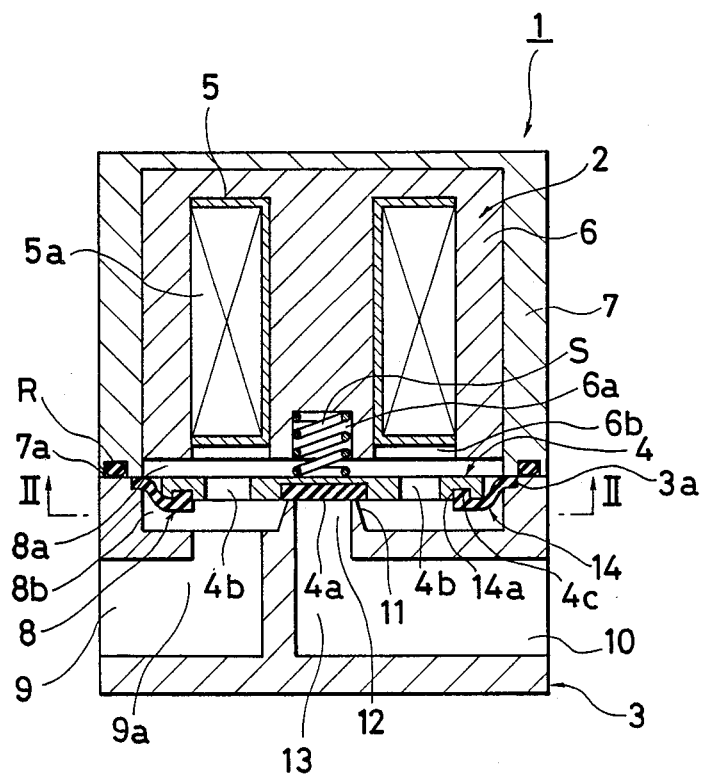
FIG. 1 is a longitudidal sectional view showing one embodiment of the solenoid valve according to the present invention.

Referring to the drawings, one embodiment of the solenoid valve is generally indicated by the reference number 1 in FIG. 1. The solenoid valve 1 includes a solenoid section 2, a valve box 3 connected to the solenoid section 2, and a movable member 4 with a valve body 4a. The solenoid section 2 is constituted by a bobbin 5 wound with a solenoid coil 5a, a columnar fixed iron core 6 and a protective cap 7 covering the outer periphery of this fixed iron core 6. The center of the columnar fixed iron core 6 is provided in the undersurface with a cylindrical groove 6a for receiving a resilient member, and an annular groove 6b for receiving the bobbin 5 is formed at the outer peripheral portion thereof. A resilient member S such as a spring is is disposed in the cylindrical groove 6a and protrudes therefrom. The bobbin 5 wound around the solenoid coil 5a is disposed in the annular groove 6b and completely therein.

The fixed iron core 6, with the bobbin 5 and the resilient member S, is disposed in the protective cap 7 such that the undersurface of the fixed iron core 6 is positioned inwardly of the open end face of the protective cap 7. Under this arrangement, a first vacant chamber 8a is formed in the protective cap 7 between the open end face of the protective cap 7 and the undersurface of the fixed iron core 6.

An O-ring groove 7a is circumferentially formed on the open end face of the protective cap 7 and accommodates an O-ring R. A contact portion between the protective cap 7 and the valve box 3 is sealed by this O-ring R, so that fluid can be prevented from leaking through the contact portion.

An input port 9 for fluid is formed at one side surface of the valve box 3 and an output port 10 for fluid is formed at the other side surface thereof. The valve box 3 has a second vacant chamber 8b at an upper open portion thereof, and this second vacant chamber 8b is connected to the first vacant chamber 8a of the solenoid section 2, to thereby form a valve chest 8.

The center of the vacant chamber 8b of the valve box 3 is provided with a valve seat 11, opposite the center of the undersurface of the solenoid section 2 and spaced a predetermined distance therefrom.

A valve port 12 of the valve seat 11 and the output port 10 communicate with each other through an output flow path 13 defined in the valve box 3. The valve port 12 of the valve seat 11 and the input port 9 are communicate with each other through an input flow path 9a defined in the valve box 3 and the valve chest 8.

The movable member 4 is formed of a disk-shaped magnetic material. A valve body 4a formed of an elastic material such as rubber is bonded to the center of the undersurface of the movable member 4. As shown FIGS. 2 and 3, in the movable member 4, includes flow-in ports 4b provided around the valve body 4a at four positions for example. The movable member 4 is provided in the valve chest 8 between the undersurface of the fixed iron core 6 and the valve seat 11. The outer peripheral side surface of the movable member 4 is spaced a predetermined distance from the inner side surface of the valve chest 8. As shown in FIG. 1, during non-excitation of the solenoid section 2, the movable member 4 is urged toward the valve seat 11 from the side of the solenoid section 2 by a biasing force of the resilient member S such as the spring and by fluid pressure of the fluid which has flowed into the valve chest 8 on the side of the first vacant chamber 8a, whereby the valve body 4a is urged against the valve seat 11, so that the valve port 12 is closed.

During excitation of the solenoid section 2, the movable member 4 is attracted by magnetic attraction of the solenoid section 2, and is separated from the valve seat 11 against the biasing force of the resilient member S and the fluid pressure of the fluid. The top surface of the movable member 4 abuts against the undersurface of the fixed iron core 6, to thereby open the valve port 12.

Thus, as excitation and non-excitation the solenoid section 2 are alternately repeated, the movable member 4 is reciprocated between the undersurface of the fixed iron core 6 and the valve seat 11. However, during this reciprocatory movement, the movable member 4 would not necessarily perform regular reciprocatory movement, because the outer peripheral portion of the movable member 4 may come into contact with or slide on the inner wall surface of the valve chest 8. To prevent such contact and sliding, the movable member 4 is supported in the valve chest 8 by a support member 14 which limits displacement of the movable member 4 in a direction perpendicular to the reciprocatory movement, i.e. in a directive horizontal to the movable member as shown in FIG. 1.

Figure 2:
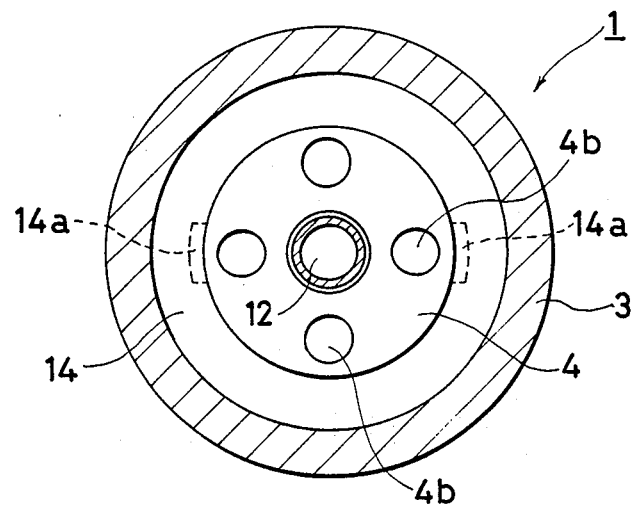
FIG. 2 is a cross-sectional view taken along the line II—II in FIG. 1.

The support member 14 is formed of an elastic material such as rubber and synthetic resin. The shape of the support member 14 as shown in FIGS. 1 and 2 is of a generally annular disk shape. The support member 14 is provided on the inner peripheral edge of the top surface with two oppositely disposed raised coupling portions. The raised coupling portions 14a are coupled and fixed into corresponding coupling grooves 4c formed on the outer peripheral edge of the undersurface of the movable member 4. Thus the inner peripheral edge portion of the support member 14 and the outer peripheral edge portion of the movable member 4 are connected to each other. The outer peripheral edge of the support member 14 is clamped between a stepped portion 3a at the top open end of the valve box 3 and the bottom open end of the protective cap 7. Thus the outer peripheral edge of the support member 14 and the inner wall surface of the valve chest 8 are connected to each other. The movable member 4 is supported in the valve chest 8 by the support member 14 thus connected. Under this arrangement the movable member 4 can be prevented from being moved or displaced in the horizontal direction as shown in FIG. 1. The reciprocatory movement of the movable member 4 between the valve seat 11 and the undersurface of the fixed iron core 6 is not hindered by the support member 14.

Figure 3:
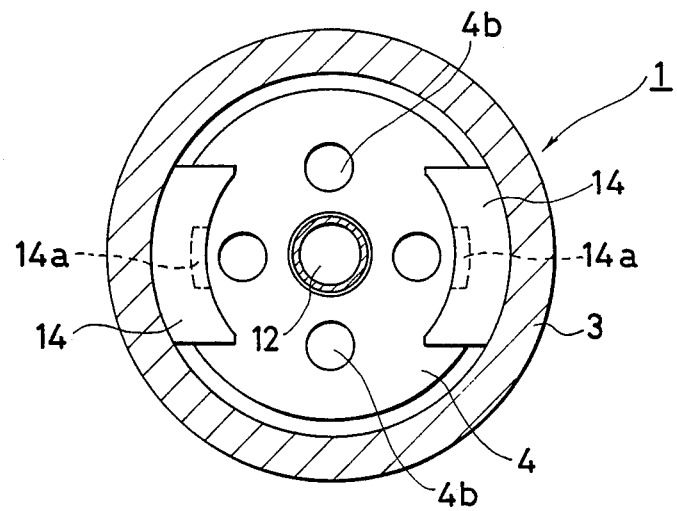
FIG. 3 is a cross-sectional view showing another embodiment of a support member other than the support member shown in FIG. 1.

In the solenoid valve shown in FIG. 3, the support member 14, has a construction of two plate pieces, wherein most of the annular disk 14 as shown in FIG. 2 is cut away. The two plate pieces are provided on the movable member 4 opposite to each other.

The solenoid shown in FIG. 3 is not different from the solenoids of FIG. 1 or 2 in any respect other than the above. Thus the parts shown in FIG. 3 are indicated by the same reference numerals as used in FIGS. 1 and 2 for simplification.

Operation of the solenoid valve 1 will now be described.

When the solenoid coil 5a of the solenoid section 2 is not energized, as shown in FIG. 1, the movable member 4 is urged toward the valve seat 11 from the underside of the solenoid section 2 by the biasing force of the resilient member S and by the fluid pressure of the fluid on the side of the first vacant chamber 8a of the valve chest 8. Thus the valve body 4a of the movable member 4 is urged against the valve seat 11, to close the valve port 12. With the valve port 12 closed, the fluid which flowed into the valve chest 8 through the input port 9 does not flow out from the output port 10 through the output flow path 13.

However, when the solenoid coil 5a of the solenoid section 2 is energized, the movable member 4, attracted by the magnetic attraction of the solenoid section 2, separates from the valve seat 11 against the biasing force of the resilient member S and the fluid pressure of the fluid. The top surface of the movable member 4 is attracted to the undersurface of the fixed iron core 6, to thereby open the valve port 12. With the valve port 12 opened, the fluid flows into the valve chest 8 from the input port 9 along the input flow path 9a. The fluid in the valve chest 8 flows to the output port 10 from the valve port 12 along the output flow path 13.

As described above, deenergizing and energizing of the solenoid coil 5a are alternately repeated, whereby the movable member 4 is reciprocated between the undersurface of the fixed iron core 6 and the valve seat 11 in the vertical direction as viewed in FIG. 1, to thereby open or close the valve port 12.

During reciprocatory movement of the movable member 4, the movable member 4 is by the support member 14 from being displaced in a direction perpendicular to the reciprocatory movement, i.e. in a horizontal direction as viewed in FIG. 1. Thus the outer peripheral portion of the movable member 4 does not come into contact with or slide on the inner wall surface of the valve chest 8. In this manner the valve port ON-OFF operation of the movable member 4 is stable and reliable and the outer peripheral portion of the movable member 4 and the inner wall surface of the valve chest 8 can be prevented from being worn.

It should be noted that, the support member 14 is formed of elastic material such as rubber and synthetic resin. However, the support member 14 may be formed of a thin-wall metal plate or a filament member such as wire and thread.

The solenoid valve according to the present invention has a movable member with a valve body, that is reciprocated between the solenoid section of the valve chest and the valve seat by magnetic attraction of the solenoid section, to thereby open or close the valve port. The solenoid valve is constructed such that the movable member is supported in the valve chest by a support member which prevents displacement of the movable member in the direction perpendicular to the moving direction. Thus, the following advantages can be obtained.

(1) The movable member is supported in the valve chest by the support member which limits displacement of the movable member in the direction perpendicular to the moving direction. Under this arrangement the movable member is not displaced in the direction perpendicular to the direction of movement of the movable member, so that the outer peripheral portion of the movable member can be prevented from coming into contact with or sliding on the inner wall surface of the valve chest.

(2) Based on Item (1), the movable member obviates and operational failure due to contact with the inner wall surface of the valve chest, so that the valve port ON-OFF operation is stabilized and reliably performed.

(3) Based on Item (1), the outer peripheral portion of the movable member and the inner wall surface of the valve chest can be prevented from being worn. Thus the problem of dust that is produced by wear is avoided and no such dust flows into the fluid circuit to cause troubles in other components. Smooth operation of the movable member is not hindered by the above-described wearing process.

Figure 4:
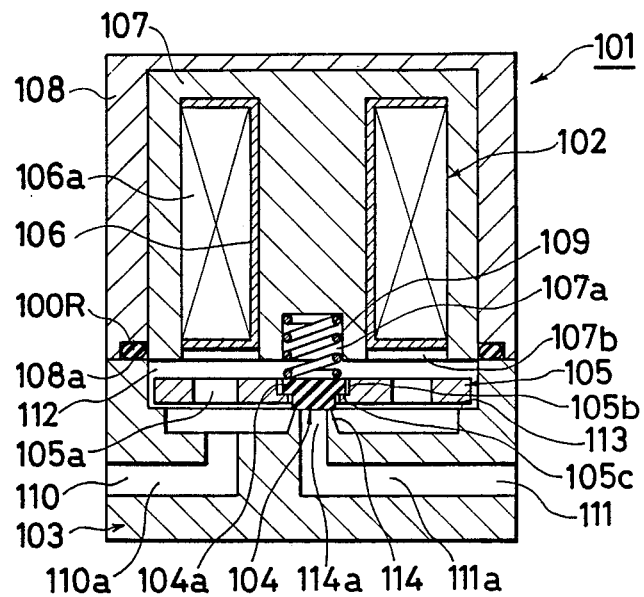
FIG. 4 is a longitudinal sectional view showing another embodiment of the solenoid valve according to the present invention.

Another embodiment of the solenoid valve as shown in FIG. 4 is generally indicated by the reference number 101. The solenoid valve 101 includes a solenoid section 102, a valve box 103 connected thereto, a valve body 104 and a movable member 105.

The solenoid section 102 includes a bobbin 106 wound with a solenoid coil 106a, a columnar fixed iron core 107 and a protective cap 108 covering the outer periphery of the fixed iron core 107. The center of the columnar fixed iron core 107 is provided in the undersurface with a recess 107a for receiving a resilient member 109, and at the outer peripheral portion with an annular groove 107b for receiving the bobbin 106. The resilient member 109 such as a spring is disposed in the recess 107a and the protrudes therefrom. The bobbin 106 is disposed in the annular groove 107b and completely recessed therein. The fixed iron core 107 having the resilient member 109 and the bobbin 106 is disposed in the protective cap 108.

Circumferentially formed on the open bottom end face of the protective cap 108 is an O-ring groove 108a, into which is disposed an O-ring 200R. A contact portion between the protective cap 108 and the valve box 103 is sealed by the O-ring 200R, thus preventing fluid from leaking.

An input port 110 for fluid is formed at one side of the lower half portion of the valve box 103, and an output port 111 is formed at the other side of the lower half portion of the valve box 103, respectively. The valve box 103 is provided at an upper half portion thereof with a valve chest 112. The valve chest 112 of the valve box 103 is constructed such that the inner diameter at the upper side thereof is large and the inner diameter at the lower side is small, whereby a checking portion 113 for the movable member 105 is formed at the inner peripheral portion by the difference in the inner diameters. The center of the valve chest 112 includes a valve seat 114 opposite to the center of the undersurface of the solenoid section 102 and spaced predetermined therefrom.

A valve port 114a of the valve seat 114 is communicates with the output port 111 along an output flow path 111a defined in the valve box 103. The valve port 114a of the valve seat 114 communicates with the input port 110 along an input flow path 110a defined in the valve box 103 and the valve chest 112.

The movable member 105 is formed of a disk-shaped magnetic material, and flow-in ports 105a are provided, for example, at four positions on the outer peripheral portion thereof. The center of the movable member 105 is provided with a coupling hole 105b for loosely accommodating the valve body 104. The coupling hole 105b is constructed such that the inner diameter at the upper side thereof is large and the inner diameter at the lower side is small, such that an engaging portion 105c is formed on the inner peripheral portion thereof by the difference in the inner diameters.

The valve body 104 is formed of an elastic material such as rubber and soft synthetic resin and is not fixed to the movable member 105. Furthermore, the valve body 104 is formed at the upper portion thereof with an engageable flange portion 104a.

The valve body 104 is loosely received into the coupling hole 105b such that the engageable flange portion 104a comes into abutting contact with the engaging portion 105c of the coupling hole 105b. The valve body 104 is biased toward the valve seat 114 by a resilient member 109 such as a spring protruding from the recess 107.

During non-excitation of the solenoid section 102, the valve body 104 is urged toward the valve seat 114 from the underside of the solenoid section 102 by the biasing force of the resilient member 109 and by fluid pressure of fluid which has flowed into the valve chest 112. Thus the valve body 104 is urged against the valve seat 114, to close the valve port 114a. With the valve port 114a closed, as shown in FIG. 4, the movable member 105 is interposed between the checking portion 113 and the engageable flange portion 104a of the valve body 104 with play in the vertical direction, and is positioned to the side of the valve seat 114.

During excitation of the solenoid section 102, the movable member 105 which is positioned to the side of the valve seat 114 is attracted by the magnetic attraction of the solenoid section 102 into abutting contact with the undersurface of the fixed iron core 107 of the solenoid section 102. When the movable member 105 moves from the side of the valve seat 114 toward the solenoid section 102, the engageable flange portion 104a of the valve body 104 is engaged with the engaging portion 105c. The valve body 104 is thus pushed from the valve seat 114 against the biasing force of the resilient member 109 and fluid pressure of the fluid which has flowed into the valve chest 112, to thereby open the valve port 114a. In other words, when the movable member 105 moves toward the solenoid section 102, the valve body 104 moves toward the solenoid section 102 in association with the movement of the movable member 105.

However, when the movable member 105 moves toward the valve seat 114 due to demagnetization of the solenoid section 102, the valve body 104 is moved toward the valve seat 114 by the biasing force of the resilient member 109 separately of the movement of the movable member 105. In this manner the valve body 104 is urged against the valve seat 114, to thereby close the valve port 114a. In other words, movement of the valve body 104 toward the valve seat 114 is not influenced by movement of the movable member 105 toward the valve seat 114. The valve body 104 is moved toward the valve seat 114 by the biasing force of the resilient member 109 independently of the movable member 105.

Operation of the solenoid valve 101 will now be described.

When the solenoid coil 106a of the solenoid section 102 is not energized, as shown in FIG. 4, the valve body 104 is urged toward the valve seat 114 from the underside of the solenoid section 102 by the biasing force of the resilient member 109. Fluid pressure of fluid which has flowed into the valve chest 112 also urges the valve body 104 against the valve seat 114, to thereby close the valve port 114a. The movable member 105, not being subjected to magnetic attraction of the solenoid section 102, is positioned at the side of the valve seat 114, between the checking portion 113 and the engageable flange portion 104a of the valve body 104, with play in the vertical direction. The valve port 114a is closed, to prevent flow of fluid between the input port 110 and the output port 111.

When the solenoid coil 106a of the solenoid section 102 is energized, the movable member 105 is attracted by the magnetic attraction of the solenoid section 102 to move toward the solenoid section 102, into abutting contact with the undersurface of the fixed iron core 107 of the solenoid section 102. During such movement of the movable member 105, the engageable flange portion 104a of the valve body 104 is engaged with the engaging portion 105c of the movable member 105 to cause upward movement of the valve body 104. The valve body 104 thus separates from the valve seat 114 against the biasing force of the resilient member 109 and the fluidal pressure of fluid which has flowed into the valve chest 112 to open the valve port 114a. The valve body 104 thus moves toward the solenoid section 102 in association with the movement of the movable member 105. When the valve port 114a is opened fluid flows from the input port 110 toward the output port 111 and outwardly of the output port 111, to actuate a given fluid pressure component, not shown.

When the solenoid coil 106a is subsequently deenergized to demagnetize the solenoid section 102, the movable member 105 is released from abutting contact with the undersurface of the fixed iron core 107. At the same time, the valve body 104 is moved toward the valve seat 114 by the biasing force of the resilient member 109 and by the fluid pressure of the fluid in the valve chest 112. The valve body 104 is thus urged against the valve seat 114, to close the valve port 114a. Due to such movement of the valve body 104, the movable member 105 is also moved toward the valve seat 114. After the valve body 104 comes into contact with the valve seat 114, the movable member 105 continues to move by its inertial force until the engaging portion 105c for the valve body separates from the engageable flange portion 104a and comes into abutting contact with the checking portion 113 and stops.

During movement of the valve body 104 and the movable member 105 toward the valve seat 114, the valve body 104 movement is not influenced by movement of the movable member 105 toward the valve seat 114. The valve body 104 moves toward the valve seat 114 independently of the movable member 105, and is urged against the valve seat 114 without being directly subjected to the inertial force of movement of the movable member 105 toward the valve seat 114. Accordingly, the inertial force of the movable member 105 is not directly applied to the contact portion between the valve body 104 and the valve seat 114. Thus the contact portions of the valve body 104 and the valve seat 114 can be prevented from being worn and/or damaged by the above-described inertial force of the movable member 105.

The deenergizing and energizing of the solenoid coil 106a are alternately repeated, whereby the valve body 104 and the movable member 105 are rciprocated between the undersurface of the fixed iron core 107 and the valve seat 114 in the vertical direction as viewed in FIG. 4, to thereby open or close the valve port 114a.

Figure 5:
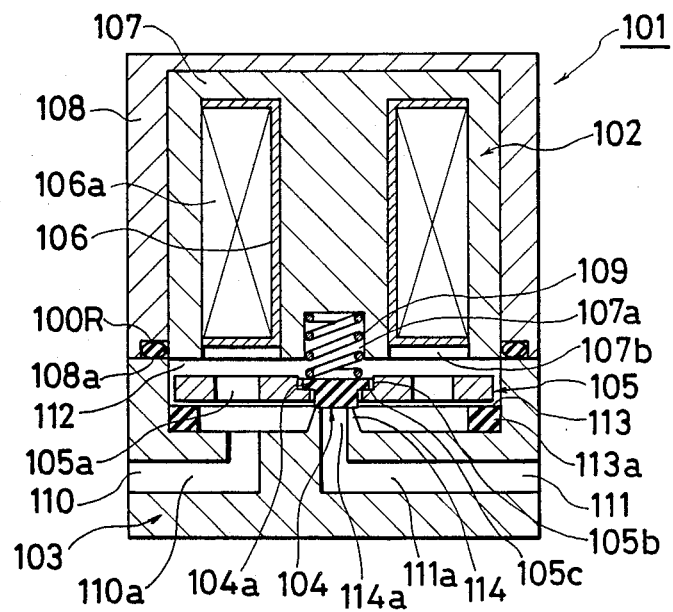
FIG. 5 is a longitudinal sectional view showing a further embodiment of the solenoid valve according to the present invention.

The solenoid valve 101 shown in FIG. 5 is identical in construction with the solenoid valve shown in FIG. 4 except that the checking portion 113 for the movable member is slightly different in construction from the one in the embodiment shown in FIG. 4. The portions or members in FIG. 5 corresponding to those in the embodiment shown in FIG. 4 are depicted by the same reference numerals to avoid repeating the description. More specifically, the checking portion 113 for the movable member in the embodiment shown in FIG. 5 is a checking member 113a formed of an elastic material such as rubber and soft synthetic resin. The checking member 113a is of annular shape and is provided at the bottom portion of the inner periphery of the valve chest 112. The checking portion 113 for the movable member is thus formed of the elastic material as described above. When the movable member 105 moves toward the valve seat 114 to come into abutting contact with the checking portion 113, an impact shock by the inertial force of the movable member 105 can be satisfactorily relieved. With this construction, the movable member 105 and the checking portion 113 can be prevented from being worn and/or damaged due to the abutting contact of the movable member 105 with the checking portion 113.

The solenoid valve of this embodiment includes the movable member attracted by th magnetic attraction of the solenoid section in the valve chest to move between the solenoid section and the valve seat,; and a valve body provided on this movable member coming into abutting contact with or being separated from the valve seat to close or open the valve port. This embodiment also includes a valve body not fixed to the movable member so that the valve body moves toward the solenoid section in association with the movement of the movable member toward the solenoid section. However, the valve body moves toward the valve seat uninfluenced by movement of the movable member toward the valve seat to provide the following advantages.

The valve body is not influenced by movement of the movable member toward the valve seat and moves toward the valve seat independently of the movable member. The valve body is urged against the valve seat without being directly subject to the inertial force due to the movement of the movable member toward the valve seat. Thus the inertial force of the movable member is not directly applied to the contact portion between the valve body and the valve seat, so that the contact portion between the valve body and the valve seat, particularly the valve body can be prevented from being worn and/or damaged by the inertial force of the movable member.

With the above-described advantage, the solenoid valve can be improved in durability and reliability.

Figure 6:
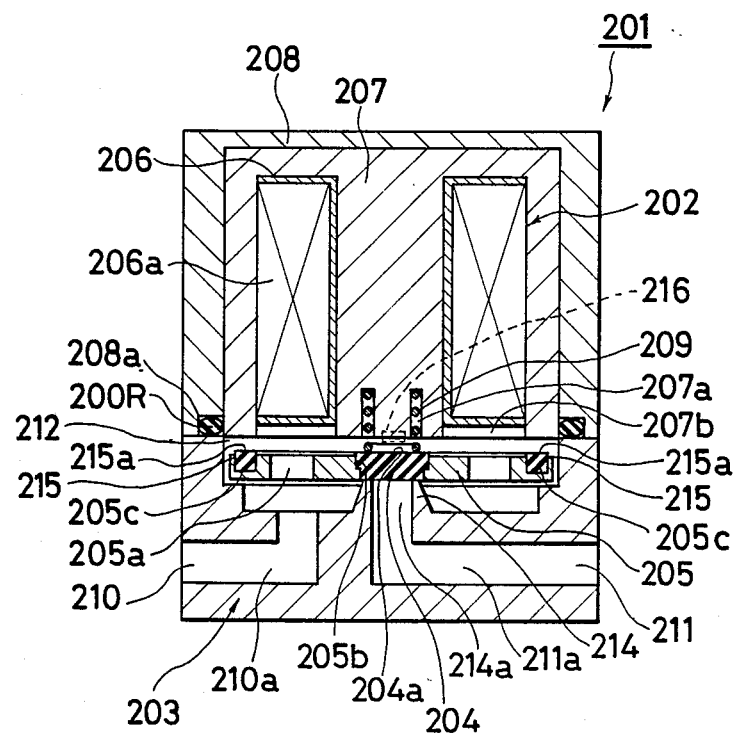
FIG. 6 is a longitudinal sectional view showing a still further embodiment of the solenoid valve according to the present invention.

A solenoid valve 201 of the embodiment shown in FIG. 6 includes a solenoid section 202, a valve box 203 connected thereto, a valve body 204 and a movable member 205.

The solenoid section 202 is constituted by a bobbin 206 wound with a solenoid coil 206a, a columnar fixed iron core 207 and a protective cap 208 covering the outer periphery of the fixed iron core 207. The center of the columnar fixed iron core 207 is provided in the undersurface with a cylindrical groove 207a for coupling a resilient member, and, at the outer peripheral portion with an annular groove 207b for receiving the bobbin. A resilient member 209 such as a spring is disposed in the cylindrical groove 207a and protrudes therefrom. The bobbin 206 is disposed in the annular groove 207b of the fixed iron core 207 and completely recessed therein. The fixed iron core 207 having the resilient member 209 and the bobbin 206 is disposed in the protective cap 208.

Circumferentially formed on the open end face of the protective cap 208 is an O-ring groove 208a, into which is disposed an O-ring 200R. A contact portion between the protective cap 208 and the valve box 203 is sealed by the O-ring 200R, so that fluid is prevented from leaking through the contact portion.

An input port 210 is formed at one side of the lower half portion of the valve box 203 and an output port 211 is formed at the other side of the lower half portion. The valve box 203 is provided in the upper portion with a valve chest 212. The center of valve chest 212 is provided a valve seat 214, which is opposite to the center of the undersurface of the solenoid section 202 and spaced a predetermined distance therefrom.

A valve port 214a of the valve seat 214 and the output port 211 communicate with each other along an output flow path 211a defined in the valve box 203. The valve port 214a of the valve seat 214 and the the input port 210 communicate with each other along an input flow path 210a define in the valve box 203 and the valve chest 212.

The movable member 205 is formed of a disk-shaped magnetic material, and flow-in ports 205a are provided, for example, at four positions on the outer peripheral portion. The center of the movable member 205 is provided with a through-hole 205b extending in the moving direction, i.e. in the vertical direction in the drawing for receiving a valve body. The top surface of the movable member 205 is provided with a plurality of radial grooves 205c for receiving shock-absorbing members 215. The shock absorbing members 215 are each formed of an elastic material and protrude slightly from the top surface of the movable member 205. The surface 215a of the shock-absorbing members 215, which is opposed to the solenoid section 202, forms a portion of the movable member 205 which abuts against the solenoid section 202.

The valve body 204 is formed of an elastic material such as rubber and soft synthetic resin. The valve body 204 is disposed in the through-hole 205b. A surface of the valve body 204, which is opposed to the solenoid section 202, is slightly raised from the top surface (one surface on the side of the solenoid section) of the movable member 205 similar to the shock-absorbing members 215, and this opposed surface 204a forms the portion of the movable member 205, which is abutted against the solenoid section 202.

The valve body 204 is biased toward the valve seat 214 by the resilient member 209 such as the spring or the like which protrudes from the cylindrical groove 207a member.

Operation of the solenoid valve 201 will now be described.

When the solenoid coil 206a of the solenoid section 202 is not energized, as shown in FIG. 6, the valve body 204 and the movable member 205 are urged toward the valve seat 214 from the underside of the solenoid section 202 by the biasing force of the resilient member 209. Fluid pressure of fluid which has flowed into the valve chest 212, also urges the valve body 204 against the valve seat 214, to thereby close the valve port 214a. With the valve port 214a being closed, fluid does not flow between the input port 210 and the output port 211.

When the solenoid coil 206a of the solenoid section 202 is energized, the valve body 214 and the movable member 205, are attracted by magnetic attraction of the solenoid section 202 to move toward the solenoid section 202. The valve body 204 is separated from the valve seat 214 to open the valve port 214a. Further, the surface 204a of the valve body 204, which is opposed to the solenoid section 202, and the surface 214a of the shock-absorbing member 215, which is also opposed to the solenoid section 202, are brought into abutting contact with the undersurface of the fixed iron core 207.

The impact shock at the time of abutting is relieved by the elasticity of the valve body 204 and the shock-absorbing member 215, such that a shocking absorbing effect of the movable member 205 against the solenoid section 202 is obtained. Under this arrangement the movable member 205 and the solenoid section 202 can be prevented from being worn due to the abutting action.

Since, at the time of abutting, the surface 204a of the valve 204, and the surface 215a of the shock-absorbing member 215, are slightly raised from the top surface of the movable member 205, the top surface of the movable member 205 is not abutted against the undersurface of the fixed iron core 207 of the solenoid section 202. Accordingly, under this arrangement, the movable member 205 and the solenoid section 202 can be prevented from being worn.

When the valve port 214a is opened the fluid flows from the input port 210 to the output port 211, outwardly through the output port 211 and actuates a given fluid pressure component, not shown.

When the solenoid coil 206a is subsequently deenergized to demagnetize the solenoid section 202, the valve body 204 and the movable member 205 are separated from the fixed iron core 207 of the solenoid section 202 by the biasing force of the resilient member 209 and by the pressure of the fluid in the valve chest 212 to move toward the valve seat 214. The valve body 204 is thus urged against the valve seat 214, to thereby close the valve port 214a.

The deenergizing and energizing of the solenoid coil 206a are alternately repeated, whereby the valve body 204 and the movable member 205 are reciprocated between the undersurface of the fixed iron core 207 and the valve seat 214 in the vertical direction as viewed in FIG. 6, to thereby open or close the valve port 214a.

Although the movable member 205 in this embodiment is provided with the shock-absorbing member 215, the shock-absorbing member 215 may be omitted.

As indicated by a broken line in FIG. 6, a shock-absorbing member 216 may be provided in the center of the undersurface of the fixed iron core 207, to further improve the shock-absorbing effect.

The solenoid valve of this embodiment includes the movable member attracted by the magnetic attraction of the solenoid section for movement in the valve chest between the solenoid section and the valve seat. The movable member is formed with a through-hole extending in the moving direction for receiving a valve body, a valve body formed of an elastic material disposed in the through-hole and the surface of the valve body, forms a portion of the movable member, which is abutted against the solenoid section, to provide the following advantages.

The impact shock between the movable member and the solenoid section at the time of abutting is relieved by the valve body for ON-OFF operation of the valve port. The valve body functions as a shock-absorbing member in addition to its ON-OFF function in operating the valve port. The the construction which provides a shock-absorbing effect between the movable member and the solenoid section can be simplified.

The valve body in its function as a shock-absorbing member is disposed in the through-hole for receiving the valve body, whereby the thickness of the valve body is not restricted by the depth of the through hole. The thickness of the valve body can be made larger than the depth of the through-hole, so that the valve body being thick and highly elastic can be used to obtain a satisfactory shock-absorbing effect.

The movable member and the solenoid section can be prevented from being worn at the time of abutting, so that the solenoid valve can be improved in durability and reliability.

Even if the thickness of the movable member is decreased, the thickness of the valve body is not restricted by the thickness of the movable member. Thus the thickness of the movable member can be decreased without reducing the shock-absorbing effect of the valve body. With the thickness of the movable member being decreased, the inertial force of the movable member is reduced during movement. Thus the impact shock of the valve body, when it abuts against the solenoid section and the valve seat, and the impact shock of the movable member, when it abuts against the solenoid section, can be relieved.

Wear of the valve body due to its abutting against the solenoid section and the valve seat and wear of the movable member due to its abutting against the solenoid section can be prevented, so that the solenoid valve can be improved in durability and reliability.

Figure 7:
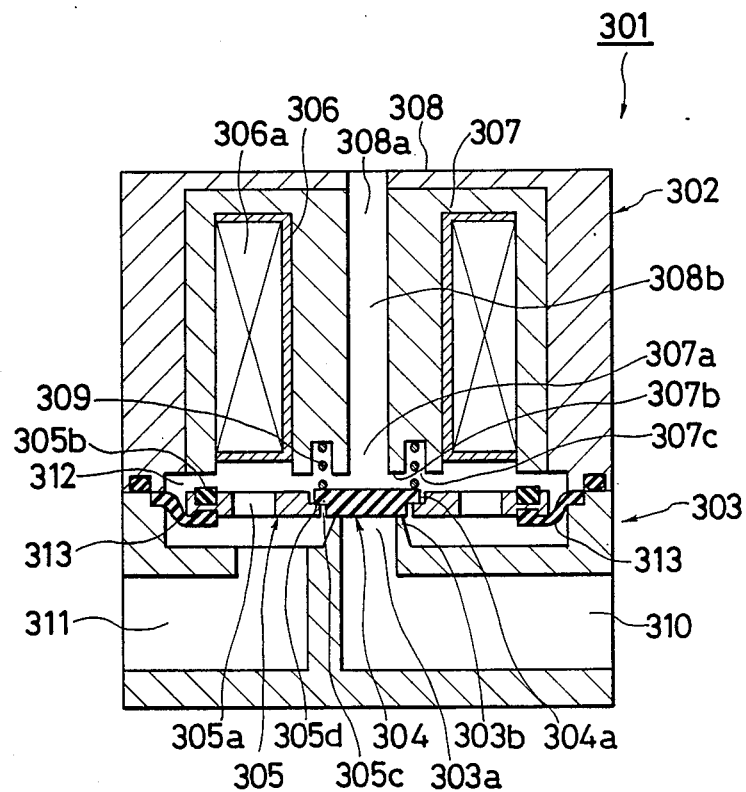
FIG. 7 is a sectional view showing a three-port solenoid valve, which is a yet further embodiment of the present invention.

A solenoid valve 301 of the embodiment shown in FIG. 7 is a three part solenoid valve, and includes a solenoid section 302, a valve box 303 connected thereto, a valve body 304 and a movable member 305.

The solenoid section 302 includes a bobbin 306 wound with a solenoid coil 306a, a fixed iron core 307 and a protective cap 308 covering the fixed iron core 307.

A first valve port 307a is formed in the center of the bottom portion of the fixed iron core 307, and a discharge port 308a is formed in the center of the top portion of the protective cap 308. The first valve port 307a and the discharge port 308a communicate with each other along a discharge flow path 308b extending through the center of the fixed iron core 307.

The center of the bottom portion of the fixed iron core 307 is formed with a recess 307c, into which is disposed a biasing means 309 such as a spring which protrudes therefrom.

An input port 310 is formed at one side (at the right in FIG. 7) of the valve box 303, and an output port 311 is formed at the opposite side (at the left in FIG. 7) of the valve box 303. In the center of the top portion of the valve box 303, a second valve port 303a is formed which is opposite the first valve port 307a and spaced a predetermined distance therefrom.

The input port 310 and the output port 311 communicate with each other through the second valve port 303a, and the output port 311 and the discharge port 308a communicate with each other through the first valve port 307a.

A valve chest 312 is formed at the junction between the solenoid section 302 and the valve box 303. The valve chest 312 is provided a movable member 305 which moves between a first valve seat 307b of the first valve port 307a and a second valve seat 303b of the second valve port 303a by electromagnetic action of the solenoid section 302.

The movable member 305 is supported in the valve chest 312 by a plurality of support members 313 each formed of an elastic member such as rubber and synthetic resin. Based on the support provided by the support member 313, the movement of the movable member 305 is restricted in the direction perpendicular to the moving direction thereof i.e, movement of the movable member 305 is not permitted in the horizontal direction in FIG. 7.

The movable member 305 is formed of a thin plate-shaped magnetic material. The movable member 305 is provided on the outer peripheral portion thereof with input/output ports 305a that extend through the movable member 305. Circumferentially formed on the outer surface of the movable member 305 on the side of the solenoid section 302 is a shock-absorbing member 305b formed of an elastic material such as rubber and soft synthetic resin. The shock absorbing member 305b protrudes slightly from the movable member 305.

A coupling hole 305c for loosely accomodating the valve body 304 is formed in the center of the movable member 305. The coupling hole 305c is formed such that the upper portion has a large diameter and the lower portion has a small diameter. An engaging portion 305d for the valve body 304 is formed in the inner peripheral portion by this difference in the inner diameters.

The valve body 304 is formed of an elastic material such as rubber and soft synthetic resin and is provided at the top portion thereof with an engageable flange portion 304a.

The engageable flange portion 304a of the valve body 304 is abutted against the engaging portion 305d of the movable member 305 and is loosely disposed in the coupling hole 305c. The valve body 304 is biased toward the second valve seat 303b by the biasing means 309, and is not fixed to the movable member 305.

During excitation of the solenoid section 302, the movable member 305 is moved toward the first valve port 307a by the magnetic attraction of the solenoid section 302. The valve body 304 is moved in association with the magnetically induced movement of the movable member 305 and is separated from the second valve seat 303b to open the second valve port 303a. The valve body 304 is thus abutted against the first valve seat 307b to close the first valve port 307a.

However, when the movable member 305 moves toward the second valve port 303a due to the demagnetization of the solenoid section 302, the valve body 304 is moved toward the second valve port 303a by the biasing force of the biasing means 309 uninfluenced by the movement of the movable member 305. The valve body 304 is separated from the first valve seat 307b to open the first valve port 307a, and is abutted against the second valve seat 303b to close the second valve port 303a.

The valve body 304 protrudes slightly from the surface of the movable member 305 on the side of the solenoid section 302, so that the impact shock between the movable member 305 and the fixed iron core 307 can be absorbed by the protruding portion of the valve body 304.

Operation of the three-port type solenoid valve 301 will now be described.

During deexcitation of the solenoid section 302, as shown in FIG. 7, the valve body 304 is abutted against the second valve seat 303b by the biasing force of the biasing means 309 to close the second valve port 303a.

The movable member 305 is positioned on the side of the second valve port 303a because the biasing force is imparted to the movable member 305 through the valve body 304.

When the solenoid section 302 is excited from the state shown in FIG. 7, the movable member 305 is moved toward the first valve port 307a by magnetic attraction of the solenoid section 302 against the biasing force of the biasing means 309. In association with movement of the movable member 305, the valve body 304 is moved toward the first valve port 307a, and is separated from the second valve seat 303b to open the second valve port 303. The valve body 304 is thus abutted against the first valve seat 307b to close the first valve port 307a.

The impact shock between the movable member 305 and the fixed iron core 307 during this excitation can be reliably absorbed by the valve body 304 and the shock-absorbing member 305b because the valve body 304 which impinges upon the first valve seat 307b is formed of an elastic member. Furthermore the shock-absorbing member 305b which impinges upon the fixed iron core 307 is provided on the movable member 305.

When the second valve port 303a is opened and the first valve port 307a is closed, the fluid such as pneumatic pressure which has been fed to the input port 310 flows from the input port 310 to the output port 311 through the second valve port 303a, and is outputted by the output port 311. The outputted fluid can thus operate a fluidal pressure component, not shown, such as, for example, a single-acting cylinder.

When the solenoid section 303 is subsequently demagnetized, the valve body 304 is moved toward the second valve port 303a by the biasing force of the biasing means 309, and is separated from the first valve seat 307b to open the first valve port 307a. The valve body 304 thus abuts against the second valve seat 303b to close the second valve port 303a.

Due to the movement of the valve body 304, the movable member 305 also moves toward the second valve port 303a and is restored to the position shown in FIG. 7.

The valve body 304, when moving toward the second valve port 303a, is not influenced by the movement of the movable member 305 and is moved toward the second valve port 303a by the biasing force of the biasing means 309 independently of the movable 305. Thus the valve body 304 is abutted against the second valve seat 303b without being subject to the inertial force due to the movement of the movable member 305.

At the time of abutting between the valve body 304 and the second valve seat 303b, the inertial force of the movable member 305 is not directly applied to either member, so that the valve body 304 and the second valve seat 303b can be reliably prevented from being worn and/or damaged.

When the first valve port 307a is opened and the second valve port 303a is closed, the flow of the fluid between the input port 310 and the output port 311 is changed over to permit flow of fluid between the output port 311 and the discharge port 308a. Due to this change-over, the fluid on the back pressure side of the fluid pressure working component, not shown, is discharged to the outside through the output port 311, the first valve port 307a and the discharge port 308a.

In this case, the fluid going through the valve chest 312 flows along the outer periphery of the movable member 305 between the support members 313, 313, . . . and through the input/output ports 305. However, the affect of the thickness of the movable member 305 on the fluid flow is low because the movable member 305 is of the thin plate shape, enabling the fluid flow to be smoothly carried out.

The valve body 304 and the movable member 305 are reciprocated between the first valve port 307a and the second valve port 303a in the vertical direction as viewed in FIG. 7. During this reciprocatory movement, the movable member 305 is restricted in displacement in a direction perpendicular to the direction of the reciprocatory movement thereof, i.e. the movable member 305 is not permitted to move in the horizontal direction in FIG. 7.

Because of the limited movement of the movable member 305 the outer peripheral portion of the movable member 305 does not come into contact with or slide on the inner wall surface of the valve chest 312. Thus unreliability and instability of the ON-OFF operations of the solenoid valve 301 by the movable member 305 and/or wear of the outer peripheral portion of the movable member 305 and the valve chest 312 can be positively avoided.

Furthermore, in the solenoid valve 301 ON-OFF operations of the first valve port 307a and the second valve port 303a are carried out by the single valve body 304, so that the solenoid valve can be rendered compact in size and simplified in construction.

Further, in the solenoid valve 301 the impact shock between the movable member 305 and the fixed iron core 307 is absorbed by the valve body 304 and the shock-absorbing member 305b, which are formed of elastic materials. Since the spring in the movable member does not absorb the impact shock the solenoid valve can be rendered compact in size and simplified in construction.

The present invention has been specifically described with reference to the foregoing embodiments. However, the present invention need not necessarily be limited to the above embodiments and, cover various modifications without departing from the gist thereof.

For example, the support member 313 is formed of elastic material such as rubber and soft synthetic resin. However, the support member 313 may be formed of a thin metallic plate or a filament member such as wire and thread.

Furthermore, the solenoid valve 301 is applied to a fluid pressure working component such as a single-acting type cylinder. However, the solenoid valve may be applied to any other fluid pressure working component or applied as a control valve for a fluid pressure working valve.

Further, the solenoid valve 301 may be formed into a two-port type solenoid valve.

The solenoid valve 301 is constructed such that the solenoid valve includes the first valve port formed on the solenoid section side, the second valve port opposed to this first valve port, the movable member being moved by the magnetic force of the solenoid section between the first and second valve ports and the valve body provided on this movable member. The movable member is supported by the support member or members for limiting the displacement of the movable member in the direction perpendicular to the moving direction thereof. The valve body is not fixed to the movable member and can move toward the second valve port without being influenced by the movement of the movable member toward the second valve port. One surface of the valve body is abutted against or separated from the first valve seat of the first valve port to close or open the first valve port and the other surface of the valve body is abutted against or separated from the second valve seat of the second valve port to close or open the second valve port, to provide the following advantages.

The movable member is supported by the support member or members, whereby the movable member is prevented from displacement in the direction perpendicular to the moving direction. Under this arrangement the outer peripheral portion of the movable member does not come into contact with or slide on the inner wall surface of the valve chest. Thus the outer peripheral portion can be prevented from being worn. The outer peripheral portion of the movable member does not come into contact with or slide on the inner wall surface chest. Thus the movable member can be operated smoothly and reliably.

The valve body is not fixed to the movable member and moves toward the second valve port without being influenced by movement of the movable member toward the second valve port. During the movement of the movable member toward the second valve port, the valve body is moved toward the second valve port and is abutted against the second valve seat without being subject to the inertial force of the movable member. Thus the valve body and the second valve seat can be effectively prevented from being worn and/or damaged.

The first and second valve ports are ON-OFF operated by the single valve body provided on the movable member, so that the solenoid valve can be rendered compact in size and simplified in construction.

With the construction of the above-described embodiments, the valve port ON-OFF operation is stabilized and can be reliably carried out.

With the construction of the above-described embodiments, the solenoid valve can be improved in durability.

With the construction of the above-described embodiments, the solenoid valve can be improved in operating reliability.

What is claimed is:

1. A solenoid valve comprising, a solenoid section capable of furnishing a magnetic force, a valve seat opposite the solenoid section, a valve chamber between the solenoid section and the valve seat, a movable member being moved in a first moving direction in the valve chamber by the magnetic force of the solenoid section, a valve body provided on said movable member, said valve body being movable toward said valve seat, said movable member being movable toward said valve seat, a support member for supporting said movable member during movement of said movable member in said valve chamber, said support member limiting displacement of said movable member in a direction perpendicular to the first moving direction of said movable member, said valve body being unattached to said movable member to permit movement of said valve body toward said valve seat without depending on the movement of said movable member toward said valve seat, so that movement of said valve body toward said valve seat is uninfluenced by movement of said movable member toward said valve seat, said valve body having a surface opposite said solenoid section, and said movable member having a corresponding surface opposite said solenoid section, said valve body surface protruding a first predetermined amount beyond the corresponding surface of said movable member toward said solenoid section, and wherein a shock absorbing member formed of an elastic material is provided on the corresponding surface of said movable member and protrudes a second predetermined amount from said corresponding surface of said movable member toward said solenoid section.

2. The solenoid valve as set forth in claim 1, wherein said support member is formed of an elastic material.

3. The solenoid valve as set forth in claim 1, wherein said valve body is formed of an elastic material.

4. The solenoid valve as set forth in claim 1, wherein said solenoid valve is a three-port type solenoid valve.

5. The solenoid valve as set forth in claim 1, wherein said solenoid valve is a two-port type solenoid valve.

6. The solenoid valve as claimed in claim 1 wherein said first and second predetermined amounts of protrusion are substantially equivalent.

7. The solenoid valve as claimed in claim 1 wherein a resilient member is disposed between said solenoid section and said valve body for biasing said valve body from the solenoid section toward said valve seat.

8. The solenoid valve as claimed in claim 1 including a valve port formed in said solenoid section, said valve seat being opposed to said valve port, said movable member being moved by the magnetic force of said solenoid section toward said solenoid section and engageable with said valve body to cause movement of said valve body against said valve port to close said valve port, biasing means for biasing said valve body toward said valve seat, de-energization of said solenoid section enabling said biasing means to urge said valve body against said valve seat, uninfluenced by movement of said movable member toward said valve seat.

9. The solenoid valve as claimed in claim 1 wherein the valve body is loosely disposed in the movable member.

* * * * *

UNITED STATES PATENT AND TRADEMARK OFFICE
CERTIFICATE OF CORRECTION

PATENT NO. : 4,848,727

DATED : July 18, 1989

INVENTOR(S) : Masahiro NANBU et al.

It is certified that error appears in the above-identified patent and that said Letters Patent is hereby corrected as shown below:

Column 1, line 63, change "disadvantages" to --disadvantage--.

Column 3, line 4, delete "absorb to absorb".

Column 3, line 7, after "obtained" change "," to --. Thus the--.

Column 3, line 40, change "remove" to --move--.

Column 5, line 43, before "therein" insert --recessed--.

Column 6, line 4, delete "are".

Column 6, line 10, after "shown" insert --in--.

Column 6, line 11, after "3," delete "in".

Column 6, line 34, after "non-excitation" insert --of--.

Column 7, line 50, after "is" insert --prevented--.

Column 8, line 20, change "and" to --any--.

Column 9, line 1, after "spaced" insert --a--.

Column 9, line 1, after "predetermined" insert --distance--.

UNITED STATES PATENT AND TRADEMARK OFFICE
CERTIFICATE OF CORRECTION

PATENT NO. : 4,848,727

DATED : July 18, 1989

INVENTOR(S) : Masahiro NANBU et al.

It is certified that error appears in the above-identified patent and that said Letters Patent is hereby corrected as shown below:

Column 11, line 11, change "rciprocated" to --reciprocated--.

Column 11, line 41, delete "th".

Column 13, lines 1 and 2, after "207a" insert --.-- and delete "member.".

Column 13, line 23, change "214a" to --215a--.

Column 13, line 36, after "valve" insert --body--.

Column 13, line 45, after "211," insert --and--.

Column 14, line 52, change "part" to --port--.

Column 17, line 1, after "movable" insert --member--.

Column 17, line 23, change "305" to --305a--.

Column 17, line 62, after "and," insert --can--.

UNITED STATES PATENT AND TRADEMARK OFFICE
CERTIFICATE OF CORRECTION

PATENT NO. : 4,848,727

DATED : July 18, 1989

INVENTOR(S) : Masahiro NANBU et al.

It is certified that error appears in the above-identified patent and that said Letters Patent is hereby corrected as shown below:

Column 18, line 40, after "surface" insert --of the valve--

Signed and Sealed this

Fourth Day of September, 1990

*Attest:*

HARRY F. MANBECK, JR.

*Attesting Officer*   *Commissioner of Patents and Trademarks*